(12) United States Patent
Lippuner

(10) Patent No.: US 8,242,434 B2
(45) Date of Patent: Aug. 14, 2012

(54) OPTOELECTRONIC ANGLE SENSOR FOR DETERMINING A ROTATIONAL ANGLE ABOUT AN AXIS AND INCLUDING A CODE CARRIER HAVING A PLANAR SELF-LUMINOUS CODING

(75) Inventor: Heinz Lippuner, Rebstein (CH)

(73) Assignee: Leica Geosystems, AG, Heerbrugg (CH)

( * ) Notice: Subject to any disclaimer, the term of this patent is extended or adjusted under 35 U.S.C. 154(b) by 854 days.

(21) Appl. No.: 12/377,462

(22) PCT Filed: Aug. 17, 2007

(86) PCT No.: PCT/EP2007/007302
§ 371 (c)(1),
(2), (4) Date: Feb. 13, 2009

(87) PCT Pub. No.: WO2008/019876
PCT Pub. Date: Feb. 21, 2008

(65) Prior Publication Data
US 2011/0315864 A1 Dec. 29, 2011

(30) Foreign Application Priority Data
Aug. 18, 2006 (EP) .................................. 06119146

(51) Int. Cl.
*G01D 5/34* (2006.01)
(52) U.S. Cl. .................. 250/231.13; 356/614; 356/616; 359/436
(58) Field of Classification Search ............ 250/231.13–231.18; 356/616–619; 341/11, 13, 31; 359/436–442, 566
See application file for complete search history.

(56) References Cited

U.S. PATENT DOCUMENTS

| 3,865,428 | A | 2/1975 | Chester |
| 6,185,343 | B1 | 2/2001 | Ikeda et al. |
| 7,145,127 | B2 | 12/2006 | Chin et al. |
| 7,903,263 | B2 * | 3/2011 | Chuma ................. 356/616 |
| 2002/0018220 | A1 | 2/2002 | Aoki |
| 2005/0072912 | A1 | 4/2005 | Mizuno et al. |

(Continued)

FOREIGN PATENT DOCUMENTS

DE 3924460 A1 2/1990

(Continued)

OTHER PUBLICATIONS

JPO Office Action issued on Aug. 24, 2011 in Japanese Patent Application No. 2009-524133.

(Continued)

*Primary Examiner* — Francis M Legasse, Jr.
(74) *Attorney, Agent, or Firm* — Maschoff Gilmore & Israelsen

(57) ABSTRACT

The invention relates to an optoelectronic angle sensor for determining a rotational angle about an axis, comprising a code carrier (2) provided with a flat coding (3) and a photosensitive detector. The code carrier (2) and the detector can be displaced about the axis in relation to each other. Said angle sensor also comprises a device for producing an evaluable image of at least one part of the coding on the detector such that the image contains information relating to a rotational position of the code carrier (2) in relation to the detector, in addition to an evaluation unit for determining the rotational angle from the image. The coding (3) is self-luminous and it also comprises at least part of the device for producing an evaluable image.

18 Claims, 3 Drawing Sheets

U.S. PATENT DOCUMENTS

2007/0131853 A1 * 6/2007 Chua et al. .............. 250/231.13

FOREIGN PATENT DOCUMENTS

| | | |
|---|---|---|
| DE | 19750474 A1 | 6/1999 |
| EP | 0 854 436 A2 | 7/1998 |
| EP | 1 722 200 A1 | 11/2006 |
| EP | 1 790 953 A1 | 5/2007 |
| JP | 58-047212 A | 3/1983 |
| JP | 59-031017 U | 2/1984 |
| JP | 01-097869 | 4/1989 |
| JP | 08-193845 | 7/1996 |
| JP | 10-206134 A | 8/1998 |
| JP | 10-253393 | 9/1998 |
| JP | 2004-347382 | 12/2004 |

OTHER PUBLICATIONS

JPO Office Action issued on Aug. 23, 2011 in Japanese Patent Application No. 2009-524127.

* cited by examiner

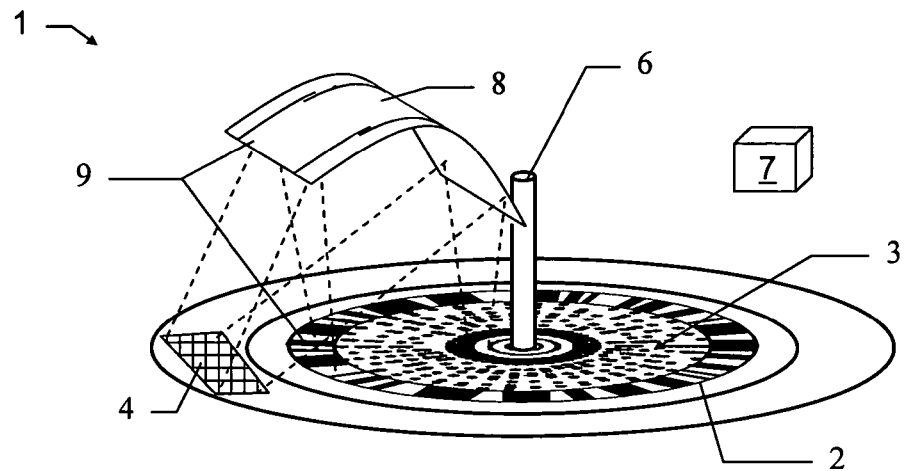
Fig. 5
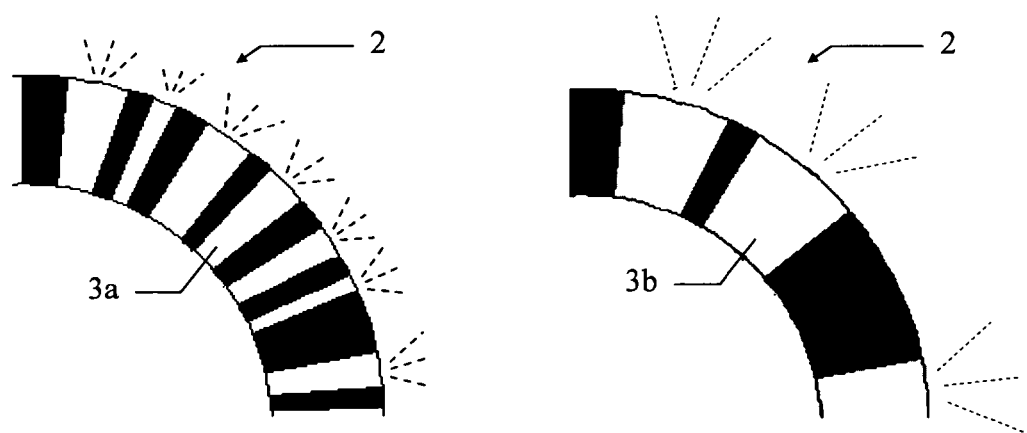
Fig. 6a                    Fig. 6b

OPTOELECTRONIC ANGLE SENSOR FOR DETERMINING A ROTATIONAL ANGLE ABOUT AN AXIS AND INCLUDING A CODE CARRIER HAVING A PLANAR SELF-LUMINOUS CODING

FIELD OF THE INVENTION

The invention relates to an optoelectronic angle sensor for determining a rotational angle about an axis.

BACKGROUND

The determination of directions, angles and lengths as positions is required in many fields of use, such as, for example, in geodetic or industrial surveying. Developments in angle measurement technology lead via mechanical reading processes to fully automated angle measurement according to the prior art today.

Known scanning methods are electronic-magnetic, electronic and optoelectronic methods. The following statements relate to optoelectronic scanning devices.

Customary optoelectronic angle sensors for determining a rotational angle about an axis have a code carrier and an optical detector which are rotatable relative to one another. The optical detector is, for example, a photodetector, a CCD line array or a CCD area array. The code carrier is in general in the form of a circular disc or in the form of a circular ring and carries, along its circumference, an optically detectable position code, of which a section is mapped onto the detector by an illumination device. In general, the code carrier of the angle sensor rotates. However, it is also possible for the code carrier to be stationery and the detector to rotate.

For determining, for example, angular positions from 0° to 360°, the coding can be arranged in a full circle and can have, for example, dark and light regions. The angular resolution of the full circle is determined by the type of coding and by the scanning device used for reading the coding. Thus, for example, the angular resolution is increased by applying a code in a plurality of tracks or by a finer division of the code, the achievable resolution being limited for reasons relating to manufacture and cost.

US 2002/0018220 A1 discloses a measuring apparatus for determining a displacement of a code carrier, a detector film comprising organic photodetectors and organic transistors being applied as a detector above the code carrier which can be displaced relative thereto and has a readable code. For illumination and production of an image of the code, a luminescent film comprising organic LEDs is arranged behind the detector film, which luminescent film illuminates a part of the code and thus produces an evaluable image thereof on the detector film.

Luminescent films have long been known. They are also used, for example, for display illuminations, or thin-film transistor displays or as graphic elements for advertising purposes and have, for example, a multiplicity of organic LEDs, these being producible cheaply and in large quantities.

Known disadvantages of angle sensors of the prior art are a complex arrangement of the detector, of the code carrier and of the illumination device which is to be effected with high precision, the detector and the illumination device usually being arranged in each case on a separate circuit board to be supplied with power. One possibility for realising a simpler design and for reducing the number of circuit boards supplied with electric power is an arrangement of the illumination device and of the detector on a common circuit board, an image of the code which is dependent on the rotational position therefore being projected onto the receiving regions of the detector by a code carrier in the form of deflection means, which is disclosed, for example, in U.S. Pat. No. 7,145,127 B2.

Expensive and continuous computational reprocessing of the data determined from the image of the code for determining the angular position is also required for eliminating errors and inaccuracies known in the case of angle sensors of the prior art, such as, for example, out-off-true running of the code carrier. Alternatively, efforts are being made to counteract such errors and inaccuracies by means of hardware, for example by adjusting mechanisms for precise positioning of the code carrier, which, however, prove to be very expensive. Thus, for accurate angle measurement according to the prior art, the components used for this purpose generally have to meet high requirements with regard to their precision in manufacture and assembly.

Furthermore, a disadvantage of codings—owing to a resolution or fineness thereof—is that, once they have been manufactured and installed in an angle sensor, they have a specific accuracy with which angular position can be determined on the basis of the respective coding. Furthermore, an incremental coding can be read only up to a limited rotational speed, depending on its resolution. If coarse codings having a lower resolution are used, an angular position can be tracked and determined even during fast rotational movements of the code carrier but the achievable accuracy is lower than in the case of codings having a high resolution.

SUMMARY

An object of the invention is to provide an improved angle sensor, in particular with a less expensive design thereof.

A further object of the invention is to provide a coding which simplifies elimination of inaccuracies during the angle measurement.

A further object of the invention is to provide an angle sensor with adaptability and improvement with regard to the accuracy of measurement, in particular in relation to a maximum permitted rotational speed of the rotating element, such as, for example, of the code carrier, for a relevant measurement.

These objects are achieved, according to the invention, by the characterising features of the independent claim. Advantageous and alternative configurations and further developments of the position-measuring method and of the position-measuring device are evident from the features of the subclaims.

An optoelectronic angle sensor according to the invention has a code carrier with a planar coding and a photosensitive detector, the code carrier being arranged so as to be rotatable about an axis relative to the detector. In contrast to angle sensors of the prior art in which usually an illumination device for producing an evaluable image of the coding on the detector is arranged, according to the invention the coding is formed to be self-luminous. Consequently, the coding itself is a device for producing an image of at least a part of the coding on the detector, which image can be evaluated with regard to a rotational position of the code carrier relative to the detector.

Furthermore, the angle sensor has an evaluation unit which, by reading the image, determines the position of the code carrier relative to the detector and hence the angle about the axis which is to be measured.

According to the invention, it is therefore possible to dispense with an additional illumination device to be arranged in an expensive manner.

Here, luminescent coding is to be understood as meaning a coding which is formed for emitting optical radiation, in particular light in the visible or near-infrared range.

The planar coding may have all patterns known from the prior art. In a simple form, the coding consists of dark, non-luminous regions and of luminous regions. In principle, it is possible to use all luminescent means which generate a coded optical image depending on the rotational position of the code carrier relative to the detector. The coding may also have regions which emit light of different wavelengths.

It is possible to use both an absolute coding and a relative, i.e. incremental, coding. However, in the case of relative codings, there is the disadvantage of having to reinitialise the angle-measuring device after a power failure.

In particular, the self-luminous coding can be realised by an electroluminescent film, also known as a luminous film or luminescent film, and can have, for example, a multiplicity of organic LEDs.

For controlling the coding, the angle sensor may have in particular a control unit so that a coding produced, for example, by an electroluminescent film can be freely configured and in particular also reconfigured.

For example, a plurality of selectable modes which have different coding patterns can be stored. Depending on the requirement of an angle measurement, a coding suitable in each case for this purpose can thus be chosen, for example, by a user and can be used for the angle measurement. In particular, the various coding patterns can differ in their resolution so that the angle sensor is adaptable to a required accuracy of measurement.

For example, known and structurally caused measurement errors and inaccuracies, such as, for example, out-of-true running during the rotational movement of the code carrier relative to the detector, can also be directly taken into account by reconfiguration of the coding and can thus be counteracted. Continuous reprocessing required in the case of angle sensors of the prior art is then no longer necessary since the coding is formed so as to be directly adaptable.

Furthermore, the coding can have as a mode, for example, a special pattern for simple and rapid initialisation of the angle sensor so that a zero position can be determined reliably and rapidly and the measurements of angles can be started immediately thereafter.

In particular, event-controlled or time-controlled automatic switching between specified modes can be effected. For example, first a low-resolution coding can be used in a first mode for a rough angle determination and automatic switching to a second mode with high-resolution coding is effected thereafter. In each case an automatic calibration can also be effected in the calibration mode at specified times.

The code carrier can be formed according to all forms known in the prior art and from materials known to the person skilled in the art, such as, for example, plastic. In particular, it has a shape with a circular cross-section, for example the shape of a circular disc, of a ring, of a cylinder or of a hollow cylinder. The code carrier can also be in the form of a segment of a circle.

In particular, sensor arrays, such as, for example, photodiodes or CCD or CMOS sensors, but also area sensors having photodiodes or CCD, CMOS or PSD sensors arranged over an area, can be used as detectors, as known from the prior art. The use of detector or scanning films, in particular comprising organic photodetectors, e.g. photodiodes, and organic transistors, is also possible.

Geodetic measuring instruments performing the function of direction and angle determination constitute one field of use for angle sensors according to the invention. Thus, for example, theodolites are equipped with horizontal and vertical reference circle and corresponding reading devices in order to be able to measure horizontal and vertical angles with very high accuracy. Position-measuring devices are also used in measuring machines of all types, such as, for example, coordinate-measuring machines having articulated arms.

BRIEF DESCRIPTION OF THE DRAWINGS

The method according to the invention is described in more detail below, purely by way of example, with reference to specific working examples shown schematically in the drawings, further advantages of the invention also being discussed. Specifically:

FIG. 5 shows a fourth embodiment of an angle sensor according to the invention;

FIG. 6a-b show a code carrier having—according to the invention—two differently configured codings.

DETAILED DESCRIPTION

Figure 1:
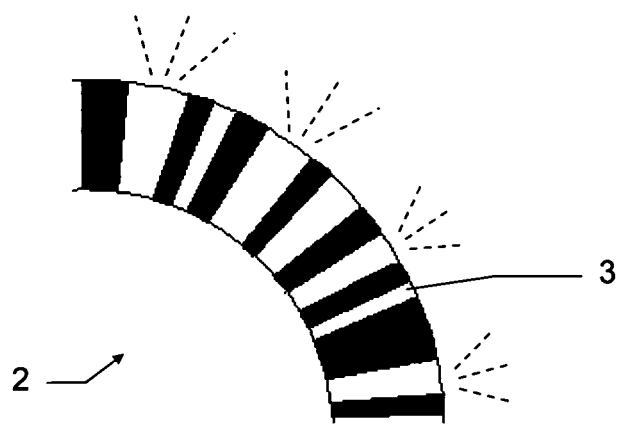
Fig.1 shows a code carrier having a self-luminous coding according to the invention.

FIG. 1 shows an annular code carrier 2 having a planar coding 3 which is applied thereon and is formed to be self-luminous.

The coding 3 is applied as a thin-film, planar element comprising a multiplicity of organic LEDs and is applied to the code carrier 2. Alternatively, the coding 3 can, however, also be formed from further luminous films known to the person skilled in the art.

Furthermore, it is possible to apply the coding 3 on the code carrier 2 or to integrate it directly into the code carrier 2. The integration of, for example, organic LEDs into the code carrier 2 has the advantage of protecting them thereby from the oxygen, which has a destructive effect on organic LEDs, and of thus increasing their life.

As a further possibility for protecting the coding, the latter can also be coated—as is known to the person skilled in the art.

As shown in FIG. 1, the coding 3 has, for example, alternately luminous regions and dark regions in a track along the circumference of the code carrier 2.

Figure 2:
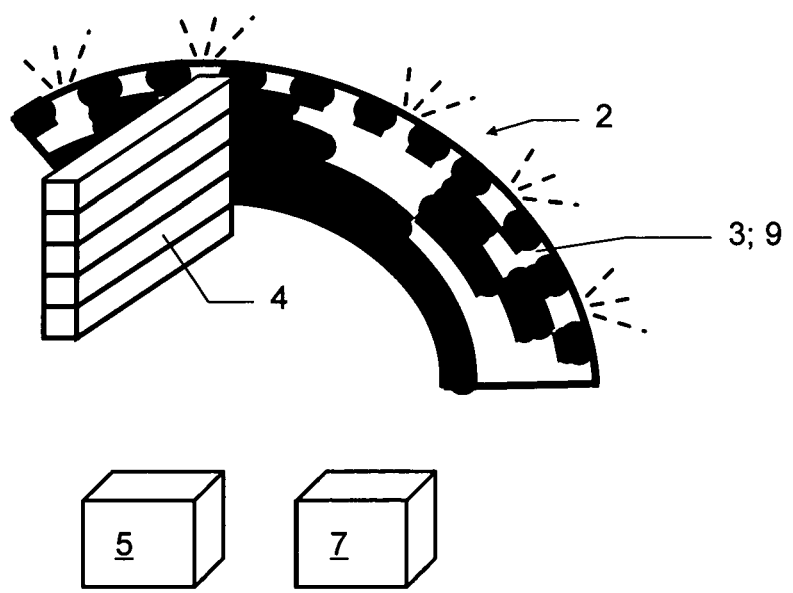
FIG. 2 shows a first embodiment of an angle sensor according to the invention.

FIG. 2 shows an optoelectronic angle sensor 1 according to the invention, comprising an annular code carrier 2 which has a planar self-luminous coding 3. A detector 4 having a line of photosensitive receiving regions is arranged opposite the code carrier 2 so that the detector 4 can receive radiation emitted by the coding 3, the code carrier 2 being formed so as to be rotatable about an axis relative to the detector 4.

The coding 3 has luminous and nonluminous areas which are arranged in a plurality of tracks in the circumferential direction of the code carrier 2. By using a plurality of tracks, the resolution of the coding is increased, with the result that an angular position can be more accurately determined. For this purpose, each photosensitive element of the detector 4 receives the radiation of the respective opposite track which is emitted by the coding 3, with the result that an evaluable image of a part of the coding 3 is produced on the detector 4, which image has information about the relative angular position of the code carrier 2. Thus, the coding 3 is itself a device 9 for producing the image on the detector 4, whereas, in the case of angle sensors of the prior art, the coding is illuminated by a further component for producing an image of said coding.

From the signals generated by the photosensitive elements of the detector 4 as a function of their illumination, the evaluation unit 5 then calculates that angular position of the code carrier 3 which is to be measured.

The coding 3 is formed, for example, so as to be freely configurable and in particular additionally reconfigurable so that, for example, a pattern, a resolution or an angle zero position of the coding 3 can be changed.

For this purpose, the angle sensor 1 has in particular a control unit 7 for controlling the luminous and nonluminous regions of the coding 3 and/or the type of illumination—for example with regard to the wavelength of the emitted radiation.

Figure 3:
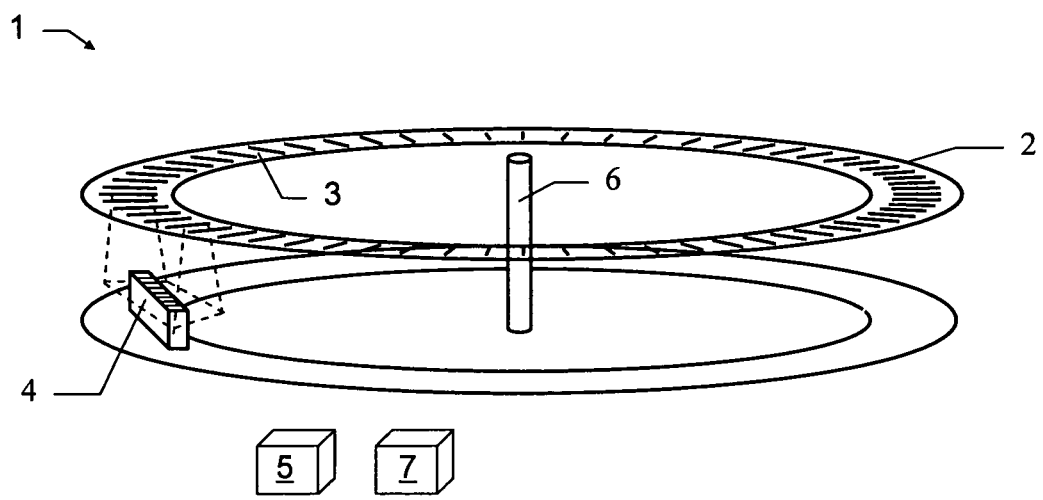
FIG. 3 shows a second embodiment of an angle sensor according to the invention.

FIG. 3 shows a further embodiment of the invention, the coding 3 being applied along the full circumference of a code carrier 2 in the form of a ring, so that angular positions from 0° to 360° can be determined. The code carrier 2 is formed so as to be rotatable about an axis 6, the detector 4 being arranged in a fixed manner.

According to the invention, the coding 3, which is controlled by the control unit 7, is formed so as to be self-luminous so that it directly generates an image of a part of the coding 3 on the detector 4.

By evaluation of the image, the evaluation unit 5 derives the angular position of the code carrier 2 relative to the detector 4 and hence the angle about the axis 6 which is to be measured.

Figure 4:
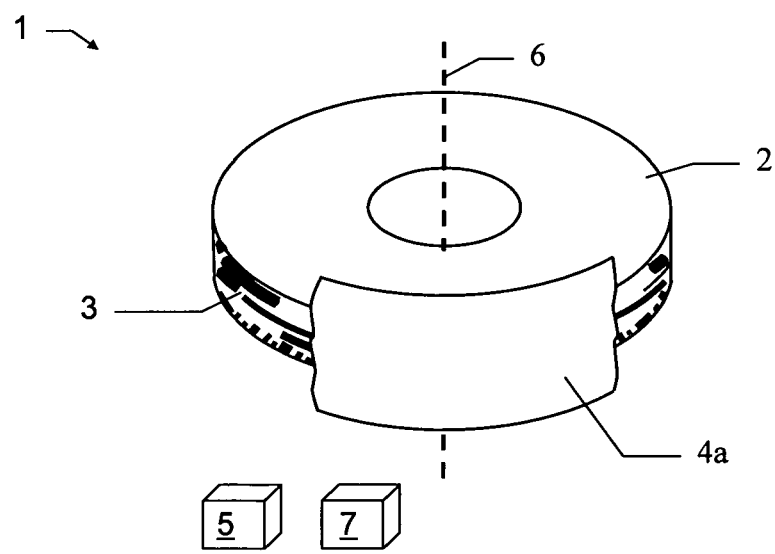
FIG. 4 shows a third embodiment of an angle sensor according to the invention.

FIG. 4 shows an angle sensor 1 according to the invention, comprising a cylindrical code carrier 2 which can be moved rotationally about the axis 6 relative to the detector.

The coding 3 which is self-luminous according to the invention is applied to the outer lateral surface of the code carrier 2 and is enclosed by a scanning film 4a which is in the form of a photosensitive detector and has in particular organic photodiodes or photocells. In particular, the scanning film 4a may cover the entire lateral surface of the code carrier 2 so that a holistic image of the coding 3 is generated on the scanning film 4a by illumination of the coding 3. The angular position of the code carrier 2 relative to the scanning film 4a and thus the angle to be measured are determined on the basis of the image—as described above—by the evaluation unit 5.

For controlling the coding 3, the angle sensor 1 once again has a control unit 7 in which, for example, two modes are stored. In an initialisation mode, for example, the control component 7 controls the luminescent coding 3 in such a way that a region of the coding 3 luminesces only at one point, for example the zero position, and the remaining area of the coding 3 does not luminesce, with the result that a zero position of the angle sensor 1 can be determined rapidly and precisely. In a measuring mode, for example, a high-resolution coding 3 suitable for an exact angle measurement can then be displayed.

FIG. 5 shows a further alternative embodiment of an angle sensor 1 according to the invention. There, the photosensitive detector 4 and the code carrier 2 in the form of a circular disc are arranged on a common plane, the code carrier 2 being mounted so as to be rotatable about the axis 6 and the detector 4 being mounted in a fixed manner.

The self-luminous coding 3 is applied to the entire circular area of the code carrier disc and can be freely configured and reconfigured by the control unit 7.

Since in general the detector has a higher resolution than that which can be achieved for the coding 3, it may be advantageous for reasons relating to miniaturisation to form the photosensitive area of the detector 4 to be smaller than that of the part of the coding which is to be mapped thereon. For this purpose, a deflection element 8 is arranged so that the radiation emitted in each case by a part-area of the coding is deflected onto the detector surface and focused thereon. Consequently, a focused, evaluable image of the coding which comprises information about the angular position of the code carrier 2 relative to the detector can be generated. In addition, the radiation received by the detector 4 can be intensified, with the result that faster reading of the code can be achieved.

For this purpose, the deflection element 8 can have, for example, refractive, diffractive or reflective elements, such as, for example, a curved mirror surface.

FIGS. 6a and 6b show a code carrier 2 having a reconfigurable coding which is self-luminous according to the invention and has various modes. FIG. 6a shows the coding in a fine mode with a first coding configuration 3a, the coding having a high resolution for precise determination of the angular position. FIG. 6b on the other hand shows the coding in a coarse mode with a second coding configuration 3b, the coding now having a lower resolution and it therefore being possible for the angular position to be measured to be tracked even during very rapid rotational movements of the code carrier.

Of course, these figures which are shown schematically represent only possible working examples. The various approaches can, according to the invention, be combined with one another and with angle sensors of the prior art.

The invention claimed is:

1. An optoelectronic angle sensor for determining a rotational angle about an axis, comprising:
    a code carrier having a planar coding;
    a photosensitive detector, the code carrier and the detector being moveable relative to one another about the axis;
    a device for generating an evaluable image of at least a part of the coding on the detector in such a way that the image comprises information about the rotational position of the code carrier relative to the detector; and
    an evaluation unit for determining the rotational angle from the image, wherein the coding is formed so as to be self-luminous, the optoelectronic angle sensor not having an illumination device for an illumination of the coding, and freely configurable and hence itself represents at least partly the device for generating an evaluable image.

2. An optoelectronic angle sensor according to claim 1, wherein the coding has a multiplicity of organic light emitting diodes.

3. An optoelectronic angle sensor according to claim 1, wherein the coding is in the form of an electroluminescent film.

4. An optoelectronic angle sensor according to claim 1, further comprising a control unit for configuring the coding.

5. An optoelectronic angle sensor according to claim 1, wherein the coding has a pattern comprising luminous and nonluminous regions.

6. An optoelectronic angle sensor according to claim 1, wherein the coding has a pattern with regions in which light of different wavelengths is emitted.

7. An optoelectronic angle sensor according to claim 1, wherein a change in a pattern of the coding is effected in a time-controlled, event-controlled and/or requirement-dependent manner.

8. An optoelectronic angle sensor according to claim 1, wherein a change in a pattern of the coding is effected in a time-controlled, event-controlled and/or requirement-dependent manner depending on a rotational speed during a movement of the code carrier relative to the detector.

9. An optoelectronic angle sensor according to claim 1, wherein a change in a pattern of the coding is effected with respect to:
 a wavelength of the emitted light; and/or
 a resolution of the coding.

10. An optoelectronic angle sensor according to claim 1, wherein the coding is formed so as to be reconfigurable.

11. An optoelectronic angle sensor according to claim 1, wherein the device additionally has a deflection means for deflected projection of the image onto the detector.

12. An optoelectronic angle sensor according to claim 1, wherein the detector is in the form of a scanning film.

13. An optoelectronic angle sensor according to claim 1, wherein the detector is in the form of a scanning film comprising organic photodiodes or photocells.

14. An optoelectronic angle sensor according to claim 10, wherein the optoelectronic angle sensor has a plurality of alternatively settable modes, the coding being differently configured for each of the modes.

15. An optoelectronic angle sensor according to claim 10, wherein a reconfiguration of the coding for compensating known measurement errors is provided.

16. An optoelectronic angle sensor according to claim 10, wherein a reconfiguration of the coding for compensating known measurement errors due to out-of-true running during a rotational movement of the code carrier relative to the detector is provided.

17. An optoelectronic angle sensor according to claim 14, wherein an angle sensor initialization mode is provided as one of the plurality of modes, in which mode the coding has a pattern suitable for determining an angle zero position.

18. An optoelectronic angle sensor according to claim 11, wherein the deflection means is formed for focusing the image onto the detector.

* * * * *

UNITED STATES PATENT AND TRADEMARK OFFICE
CERTIFICATE OF CORRECTION

PATENT NO. : 8,242,434 B2
APPLICATION NO. : 12/377462
DATED : August 14, 2012
INVENTOR(S) : Lippuner It is certified that error appears in the above-identified patent and that said Letters Patent is hereby corrected as shown below:

On the Title Page, in Field (73), under "Assignee", in Column 1, Line 1, delete "Leica Geosystems, AG," and insert -- Leica Geosystems AG, --, therefor.

Signed and Sealed this
Ninth Day of April, 2013

Teresa Stanek Rea
*Acting Director of the United States Patent and Trademark Office*